(12) United States Patent
Fukata

(10) Patent No.: US 9,993,882 B2
(45) Date of Patent: Jun. 12, 2018

(54) ROUGHING END MILL

(71) Applicant: MITSUBISHI MATERIALS CORPORATION, Tokyo (JP)

(72) Inventor: Koji Fukata, Akashi (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 245 days.

(21) Appl. No.: 15/030,963

(22) PCT Filed: Nov. 6, 2014

(86) PCT No.: PCT/JP2014/079427
§ 371 (c)(1),
(2) Date: Apr. 21, 2016

(87) PCT Pub. No.: WO2015/072389
PCT Pub. Date: May 21, 2015

(65) Prior Publication Data
US 2016/0263668 A1    Sep. 15, 2016

(30) Foreign Application Priority Data
Nov. 12, 2013 (JP) .................. 2013-233970

(51) Int. Cl.
*B23C 5/10* (2006.01)
*B23C 5/00* (2006.01)

(52) U.S. Cl.
CPC ............... *B23C 5/10* (2013.01); *B23C 5/003* (2013.01); *B23C 2210/0414* (2013.01);
(Continued)

(58) Field of Classification Search
CPC ..... B23C 5/003; B23C 5/10; B23C 2210/088; B23C 2210/086; B23C 2210/486; B23C 5/00; B23C 5/02; B23C 5/04; B23C 5/16
See application file for complete search history.

(56) References Cited

U.S. PATENT DOCUMENTS 4,721,421 A * 1/1988 Klinger ..................... B23C 5/10
407/116
7,563,059 B2 * 7/2009 Song ......................... B23C 5/10
407/53
(Continued)

FOREIGN PATENT DOCUMENTS

CN       101511514 A      8/2009
CN       202114326 U      1/2012
(Continued)

OTHER PUBLICATIONS

Search Report dated Jun. 14, 2017, issued for the European patent application No. 14861371.4.
(Continued)

*Primary Examiner* — Daniel Howell
(74) *Attorney, Agent, or Firm* — Locke Lord LLP

(57) ABSTRACT

In a roughing end mill, an end mill main body is provided with: a peripheral cutting edge; an end cutting edge; and a corner cutting edge formed between the peripheral cutting edge and the end cutting edge. A roughing part having a waveform pattern of recesses and protrusions is formed in the peripheral cutting edge, and a phase of the recesses and protrusions of the roughing part of one chip discharge flute is shifted with respect to that of the other chip discharge flute adjacent to the one chip discharge flute. A foremost protrusion of the roughing part of one peripheral cutting edge is located closer to a distal end of the end mill main body than those of the other peripheral cutting edges, a peak of the foremost protrusion of the one peripheral cutting edge is aligned with another peak of the corner cutting edge adjacent to the one peripheral cutting edge. Also, a peak of a foremost protrusion of the roughing part of each of the other peripheral cutting edges is connected to another peak of the corner cutting edge adjacent to the other peripheral cutting
(Continued)

edge by another straight portion extending in a linear manner.

6 Claims, 6 Drawing Sheets

(52) U.S. Cl.
CPC .. *B23C 2210/088* (2013.01); *B23C 2210/202* (2013.01); *B23C 2210/203* (2013.01); *B23C 2210/486* (2013.01); *B23C 2220/60* (2013.01)

(56) References Cited

U.S. PATENT DOCUMENTS

| | | |
|---|---|---|
| 2010/0047026 A1 | 2/2010 | Horiike et al. |
| 2010/0215447 A1 | 8/2010 | Davis |
| 2012/0020749 A1 | 1/2012 | Maeda et al. |
| 2013/0022416 A1 | 1/2013 | Strasmann |

FOREIGN PATENT DOCUMENTS

| | | | |
|---|---|---|---|
| CN | 202555883 U | 11/2012 | |
| JP | 52119593 A * | 10/1977 | ............... B23C 5/10 |
| JP | 01-127214 A | 5/1989 | |
| JP | 07-185925 A | 7/1995 | |
| JP | 07-299635 A | 11/1995 | |
| JP | 2005-279886 A | 10/2005 | |
| JP | 3711218 B2 | 11/2005 | |
| JP | 2006-000981 A | 1/2006 | |
| JP | 2008-110450 A | 5/2008 | |
| JP | 2009-262317 A | 11/2009 | |
| JP | 2011-000696 A | 1/2011 | |
| JP | 2016190300 A * | 11/2016 | ............... B23C 5/10 |
| WO | 2008/052503 A1 | 5/2008 | |

OTHER PUBLICATIONS

International Search Report dated Feb. 10, 2015, issued for PCT/JP2014/079427 and English translation thereof.
Office Action dated Dec. 21, 2016, issued for the Chinese patent application No. 201480056159.3 and a partial English translation of Search Report.

* cited by examiner

ROUGHING END MILL

TECHNICAL FIELD

The present invention relates to a roughing end mill in which a roughing part having a waveform pattern of recesses and protrusions when viewed from a rotation direction of the end mill is formed at a peripheral cutting edge formed at an outer periphery of a distal end portion of an end mill main body which is capable of being rotated around an axial line.

Priority is claimed on Japanese Patent Application No. 2013-233970, filed Nov. 12, 2013, the content of which is incorporated herein by reference.

BACKGROUND ART

As such a roughing end milk in, for example, PTL 1, there is proposed a roughing end mill in which an end cutting edge extending toward the outer periphery from the axial line is formed at a distal end of an end mill main body which is capable of being rotated around the axial line, a peripheral cutting edge which extends toward the posterior end while having a waveform pattern of recesses and protrusions when viewed from a rotation direction of the end mill is formed at an outer periphery of a distal end portion of the end mill main body, and a corner culling edge convexly protruding toward the outer periphery of the distal end when viewed from the rotation direction of the end mill is formed at a corner portion between the peripheral cutting edge and the end cutting edge.

CITATION LIST

Patent Literature

[PTL 1] Japanese Unexamined Patent Application, First Publication No. 2005-279886

SUMMARY OF INVENTION

Technical Problem

Incidentally, in a case where a recess having a cup-shaped inclined inner wall face is formed in, for example, a metal die by such a roughing end mill, first, a hole is formed at a position corresponding to the bottom of the recess of the metal die by helical machining which digs down into a work material while spirally turning the end mill main body, subsequently, rough machining is performed by exclusively using the corrugated peripheral cutting edge by driving the end mill main body up in a staircase pattern along the inclined inner wall face of the recess while expanding the inner diameter of the hole, and finally, finish machining of the inclined inner surface of the recess is performed by exclusively using the convexly protruding corner cutting edge while revolving the end mill main body as tracing a contour line of the recess.

However, in the roughing end mill described in PTL 1, a corrugated portion of the peripheral cutting edge and the convexly protruding corner cutting edge intersect one another, whereby a sharp corner portion is formed at the intersection point, and thus in particular, at the time of rough machining, fracturing easily occurs in the corner portion between the peripheral cutting edge and the corner cutting edge intersecting in this manner. Further, also in the final finish machining, a machined surface may be damaged by the corner portion, and thus there is a concern that good finished surface accuracy may not be able to be obtained.

The present invention has been made in light of the above circumstances and has an object to provide a roughing end mill in which even in machining which forms a cup-shaped recess in a metal die, as described above, fracturing or the like does not occur in an end mill main body, and it is possible to obtain good finished surface accuracy.

Solution to Problem

In order to achieve such an object by solving the above-described problem, according to an aspect of the present invention, a roughing end mill comprising: an end mill main body which is capable of being rotated around an axial line thereof; and a plurality of chip discharge flutes formed on an outer periphery of a distal end portion of the end mill main body so as to extend in an axial direction of the end mill main body and which are arranged at intervals in a circumferential direction of the end mill main body, wherein the end mill main body is provided with: a peripheral cutting edge formed at an outer periphery section of a ridge portion of a wall surface of each of the chip discharge flutes, the wall surface facing a rotation direction of the end mill; an end cutting edge formed at a distal end section of the ridge portion of the wall surface; and a corner cutting edge formed at a corner portion between the peripheral cutting edge and the end cutting edge, and which has a convex curved line shape such that the corner cutting edge is raised outward the end mill main body, wherein a roughing part having a waveform pattern of recesses and protrusions when viewed from the rotation direction of the end mill is formed in the peripheral cutting edge of each of the chip discharge flutes, wherein a phase of the recesses and protrusions of the roughing part of one chip discharge flute is shifted with respect to that of the other chip discharge flute adjacent to the one chip discharge flute in the circumferential direction, a foremost protrusion of the roughing part of one peripheral cutting edge is located closer to a distal end of the end mill main body than those of the other peripheral cutting edges, a peak in a radial direction of the foremost protrusion of the one peripheral cutting edge is aligned with another peak in the radial direction of the corner cutting edge adjacent to the one peripheral cutting edge, or connected to the another peak in the radial direction of the corner cutting edge by a straight portion extending in a linear manner when viewed from the rotation direction of the end mill, and a peak in the radial direction of a foremost protrusion of the roughing part of each of the other peripheral cutting edges is connected to another peak in the radial direction of the corner cutting edge adjacent to the other peripheral cutting edge by another straight portion extending in a linear manner when viewed from the rotation direction of the end mill.

Therefore, in the roughing end mill configured in this manner, among the peripheral cutting edges, in the peripheral cutting edge in which the foremost protrusion of the roughing part is located closest to the distal end in the direction of the axial line, the peak in the radial direction of the foremost protrusion is aligned with the peak in the radial direction of the corner cutting edge, or connected to the peak in the radial direction of the corner cutting edge by the straight portion. And in other peripheral cutting edges, the peak of the foremost protrusion and the peak of the corner cutting edge are connected by the straight portion. Therefore, formation of a sharp corner portion due to intersection of the roughing part of the peripheral cutting edge with the corner cutting edge does not occur. For this reason, even in a case of forming a cup-shaped recess in a metal die, as described above, at the time of rough machining, fracturing does not occur in such a corner portion, and at the time of finish machining, a machined surface is not damaged by a corner portion. Therefore, it is possible to continuously perform machining by a single roughing end mill, which is thus efficient.

In the roughing end mill, a length in the axial direction of the straight portion of each of the peripheral cutting edges is less than or equal to twice a pitch of the waveform pattern of the roughing part. If a peripheral cutting edge with a length to the extent that the length in the direction of the axial line of the straight portion exceeds twice the pitch of the waveform f the roughing part is formed, there is concern which will be described below. That is, a vibration suppression effect by the roughing part at the time of rough machining is impaired, and thus a surface accuracy is degraded, and as a result, there is a concern that a finished surface accuracy may also be degraded. Further, among the peripheral cutting edges, in the peripheral cutting edge in which the foremost protrusion of the roughing part is located closest to the distal end in the direction of the axial line, in a case where the peak in the radial direction of the foremost protrusion is aligned with the peak in the radial direction of the corner cutting edge, the length of the straight portion becomes 0.

In the roughing end mill, a first radius of the end mill main body which is a length between the axial line and a peak in the radial direction of the other protrusions excluding the foremost protrusion of the roughing part of each of the peripheral cutting edges is equal to a second radius of the end mill body which is a length between the axial line and the peak of the foremost protrusion of the roughing part, or is smaller than the second radius by in a range up to 0.04 mm. If the first radii from the axial line of the peaks in the radial direction of the protrusions other than the foremost protrusion in the roughing part, are larger than the second radius of the peak of the foremost protrusion, that is, the protrusions other than the foremost protrusion protrude further toward the outer periphery than the foremost protrusion, at the time of finish machining, the protrusions other than the foremost protrusion of the roughing part may interfere with a machined surface, and thus a finished surface accuracy may be impaired. On the other hand, if the first radii of the peaks of the protrusions other than the foremost protrusion, are smaller by more than 0.04 mm than the second radius of the peak of the foremost protrusion, conversely, the foremost protrusion and the corner cutting edge protrude too much, and thus at the time f rough machining, large uncut portions are left behind and a cutting margin at the time of finish machining increases. Therefore, there is a concern that efficient machining may be impeded or the finished surface accuracy may be degraded.

In the roughing end mill, a first clearance angle in the straight portion of the peripheral cutting edge is equal to a second clearance angle in the roughing part, or is smaller than the second clearance angle by in a range up to 2 degrees. In particular, as described above, if the first radii from the axial line of the peaks of the protrusions other than the foremost protrusion in the roughing part are smaller than the second radius of the peak of the foremost protrusion, in the straight portion of the peripheral cutting edge, a cutting margin the rough machining becomes greater. And in finish machining, the straight portion is a portion which is connected to the corner cutting edge and used for cutting. Therefore, if the straight portion is damaged, this will influence an end mill life. Therefore, it is desirable to secure a sufficient cutting edge strength by increasing a wedge angle by making the first clearance angle in the straight portion equal to or smaller than the second clearance angle in the roughing part. However, if the first clearance angle of the straight portion is more than 2 degrees smaller than the second clearance angle of the roughing part, rather, there is a concern that damage due to wear or the like may easily occur.

In the roughing end mill, the foremost protrusion of the roughing part of the one peripheral cutting edge is located closer to the distal end of the end mill main body than those of the other peripheral cutting edges, the peak in the radial direction of the foremost protrusion of the one peripheral cutting edge is aligned with the peak in the radial direction of the corner cutting edge, thereby intersecting a tangent line to the peak in the radial direction of the corner cutting edge when viewed from the rotation direction of the end mill at an angle of inclination less than or equal to 10 degrees, or connected to the peak in the radial direction of the corner cutting edge by the straight portion extending in the linear manner when viewed from the rotation direction of the end mill, thereby intersecting the straight portion at an angle of inclination less than or equal to 10 degrees. Therefore, if an angle of inclination with respect to the tangent line to the peak in the radial direction of the corner cutting edge or an angle of inclination with respect to the straight portion is less than or equal to 10 degrees, the corner portion is prevented from becoming sharp, and thus it is possible to prevent occurrence of fracturing or the like. Of course, the protrusion has a convex curved line and is in contact with the corner cutting edge or the straight portion at the peak thereof, and thus the angle of inclination may be 0 degree.

Advantageous Effects of Invention

As described above, according to the aspect of the present invention, it becomes possible to efficiently perform machining which forms a cup-shaped recess having an inclined inner wall face in a metal die, by a single roughing end mill without causing fracturing of the end mill main body or degradation of the finished surface accuracy.

DESCRIPTION OF EMBODIMENTS

Figure 1:
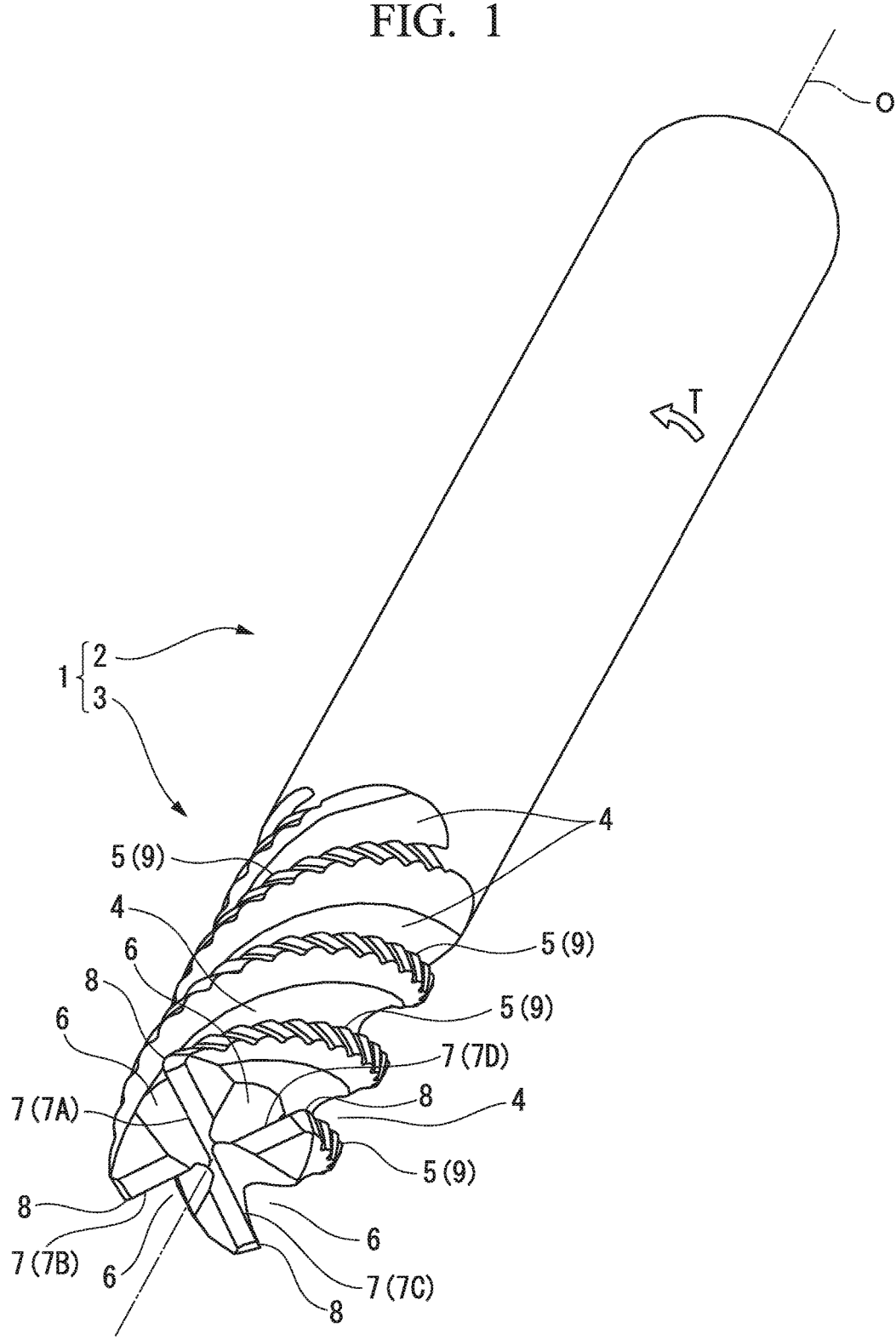
FIG. 1 is a perspective view showing a first embodiment of the present invention.
Figure 2:
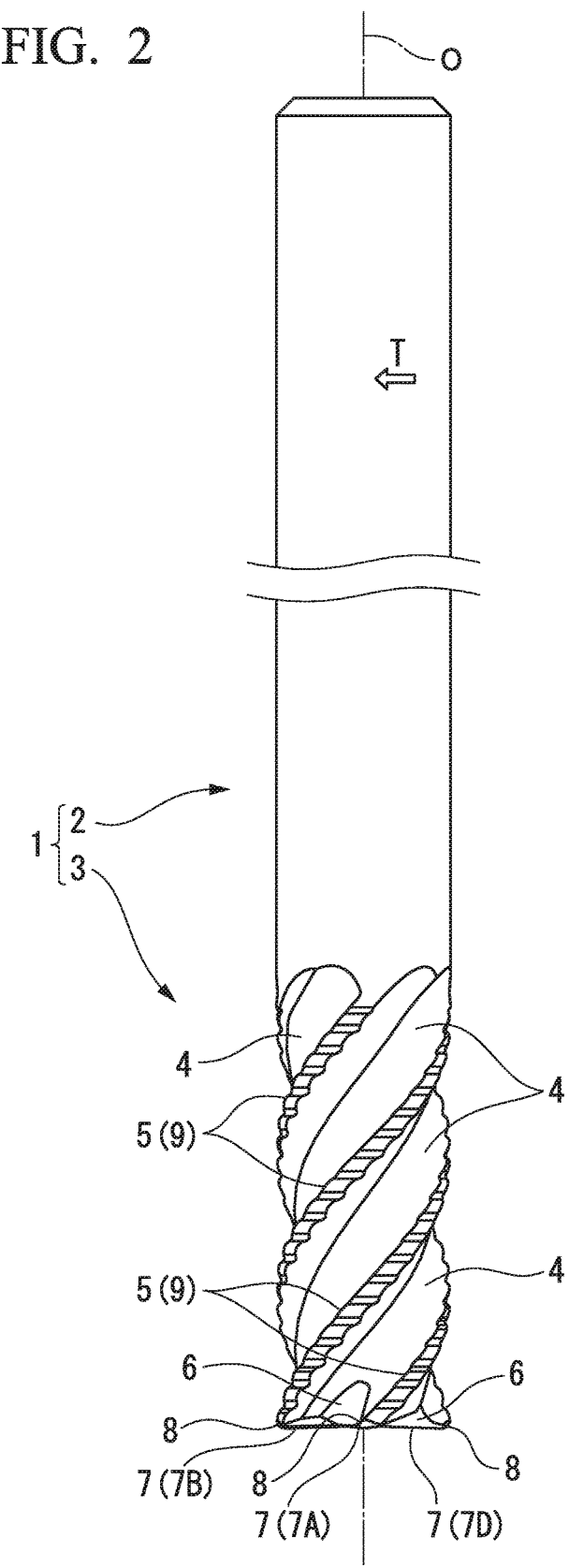
FIG. 2 is a side view of the embodiment shown in FIG. 1.

FIGS. 1 to 4D show a first embodiment of the present invention. In this embodiment, an end mill main body 1 is formed of a hard material such as cemented carbide and has a substantially cylindrical shape centered on an axial line O, A posterior end portion (an upper right portion in FIG. 1, an upper portion in FIG. 2) of the end mill main body 1 is a shank portion 2 having a cylindrical shape, and a distal end portion (a lower left portion in FIG. 1, a lower portion in FIG. 2) of the end mill main body 1 is a cutting edge portion 3. Such a roughing end mill performs a cutting operation of a metal die or the like, by being fed in a direction perpendicular to the axial line O or obliquely to the axial line O, while being rotated in an rotation direction T of the end mill around the axial line O, in a state where the shank portion 2 is gripped by a main spindle of a machine tool.

In the outer periphery of the cutting edge portion 3, a plurality of (in the first embodiment, four) chip discharge flutes 4 are formed at intervals in a circumferential direction toward the posterior end from the distal end of the end mill main body 1. These chip discharge flutes 4 are formed in a spiral shape twisted so as to turn in the opposite direction of the rotation direction T of the end mill as it goes toward the posterior end from the distal end of the end mill main body 1. At an outer periphery section of a ridge portion of a wall surface facing the rotation direction T of the end mill of each of the chip discharge flutes 4, a peripheral cutting edge 5 with the wall surface as a rake face is formed. Therefore, these peripheral cutting edges 5 are also formed in a spiral shape twisted so as to turn in the opposite direction of the rotation direction T of the end mill toward the posterior end from the distal end of the end mill main body 1.

Further, at a distal end portion of each of the chip discharge flutes 4, a recessed groove-shaped gash 6 which communicates with the chip discharge flute 4 is formed such the outer periphery of the end mill main body 1 is carved inward. An end cutting edge 7 extending toward the outer periphery from the inner periphery of the distal end of the end mill main body 1 is formed at a distal end section of the ridge portion of a wall surface facing the rotation direction T of the end mill of each of the gashes 6, which is connected to the wall surface of the chip discharge flute 4. Further, at a corner portion between the end cutting edge 7 and the peripheral cutting edge 5, a corner cutting edge 8 is formed so as to smoothly connect the distal end of the peripheral cutting edge 5 from an outer peripheral end of the end cutting edge 7. The corner cutting edge 8 has a convex curved line shape such as a quarter arc which is raised outward the end mill main body 1, as shown in FIGS. 4A to 4D, when viewed from the rotation direction T of the end mill.

Figure 3:
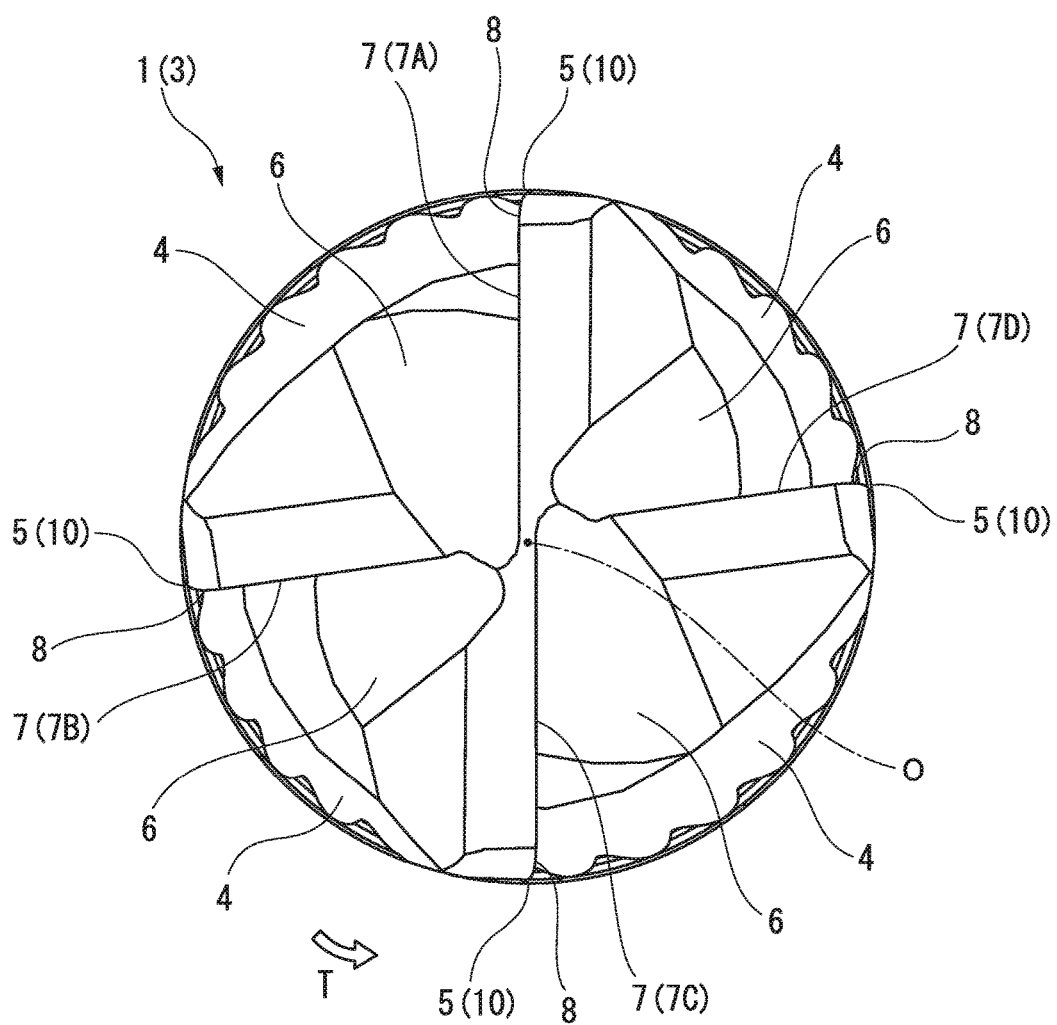
FIG. 3 is an enlarged bottom view of the embodiment shown in FIG. 1.
Figure 4A:
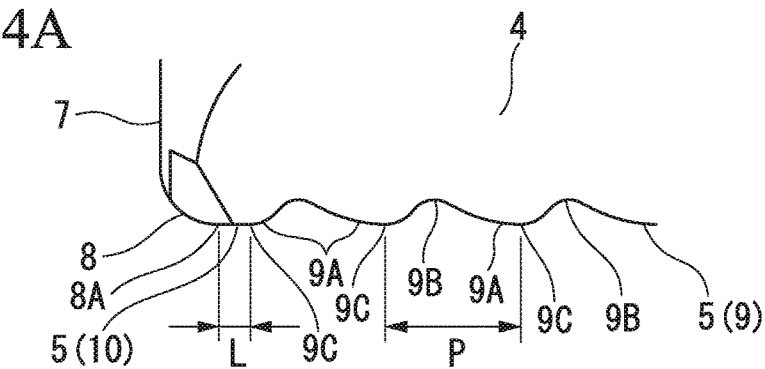
FIG. 4A is an enlarged view when a first cutting edge portion of the embodiment shown in FIG. 1 is viewed from a rotation direction of the end mill.
Figure 4B:
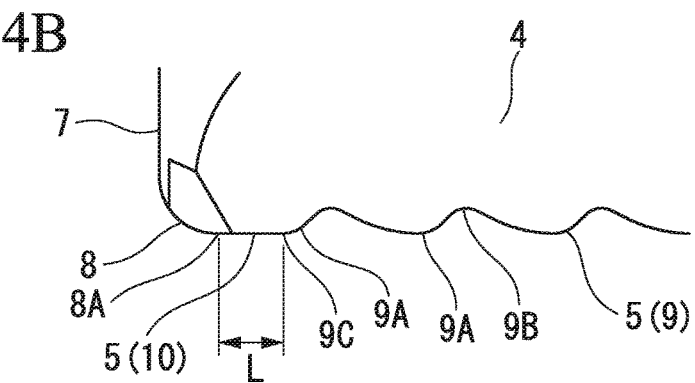
FIG. 4B is an enlarged view when a second cutting edge portion of the embodiment shown in FIG. 1 is viewed from the rotation direction of the end mill.
Figure 4C:
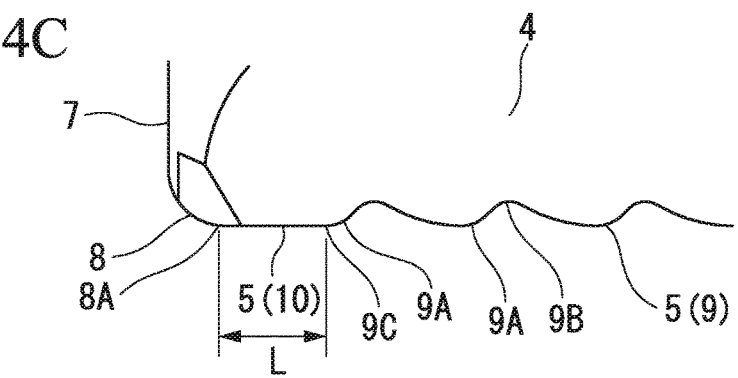
FIG. 4C is an enlarged view when a third cutting portion of the embodiment shown in FIG. 1 is viewed from the rotation direction of the end mill.
Figure 4D:
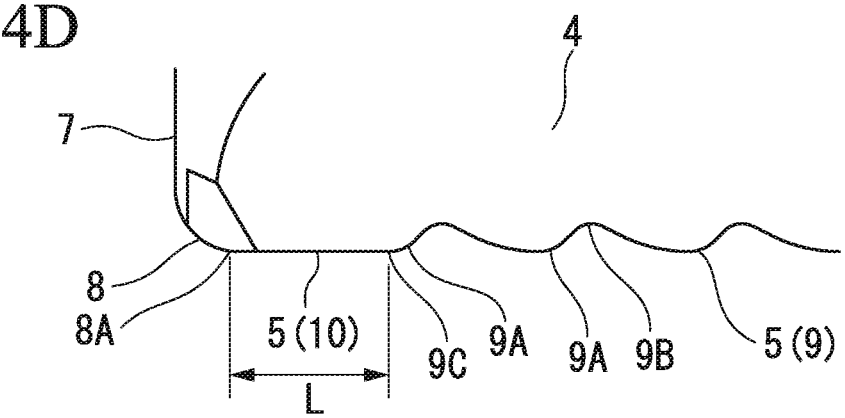
FIG. 4D is an enlarged view when a fourth cutting edge portion of the embodiment shown in FIG. 1 is viewed from the rotation direction of the end mill.

Further, in this embodiment, in the end cutting edges 7, as shown in FIG. 3, long end cutting edges 7A and 7C each extending from the vicinity of the axial line O to the outer periphery of the end mill main body 1, and short end cutting edges 7B and 7D each extending from a position further spaced apart from the axial line O to the outer periphery than in each of the long end cutting edges 7A and 7C, are formed alternately in the circumferential direction. The distance in the circumferential direction between each of the long end cutting edges 7A and 7C and each of the short end cutting edges 7B and 7D adjacent to the rotation direction T of the end mill thereof is made to be larger than the distance between each of the short end cutting edges 7B and 7D and each of the long end cutting edges 7A and 7C adjacent to the rotation direction T of the end mill thereof. And the gashes 6 in which the long end cutting edges 7A and 7C are formed so as to cross each other beyond the axial line O in a bottom view of the end mill main body 1 viewed from the distal end, thereby intersecting the inner peripheral ends of the short end cutting edges 7B and 7D adjacent to the rotation direction T of the end mill, and communicate with the gashes 6 of the short end cutting edges 7B and 7D.

Further, four of the end cutting edges 7 and four of the corner cutting edges 8 are formed in the cutting edge portion 3, the cutting edges are formed such that rotation loci around the axial line O coincide with each other. Of these, the rotation locus of the end cutting edge 7 is made so as to form a single plane perpendicular to the axial line O or form a concave conical surface recessed so as to face slightly the posterior end as it goes toward the inner periphery of the end mill main body 1. Further, in this embodiment, the gashes 6 and the end cutting edges 7 are formed in a 180° rotational symmetry in which the shape when the end mill main body 1 has been rotated 180° around the axial line O coincides with the shape of the end mill main body 1 at the original position.

On the other hand, in the peripheral cutting edge 5, a roughing part 9 having a waveform pattern of recesses and protrusions when viewed from the rotation direction T of the end mill, as shown in FIGS. 4A to 4D, is formed in the peripheral cutting edge 5 of each of the chip discharge flutes 4, wherein a phase of the recesses and protrusions of the roughing part 9 of one chip discharge flute 4 is shifted with respect to that of the other chip discharge flute 4 adjacent to the one chip discharge flute 4 in the circumferential direction. The roughing part 9 is formed by making a flank face of the peripheral cutting edge 5 which intersects the wall surface facing the rotation direction T of the end mill of the chip discharge flute 4, which becomes the rake face of the peripheral cutting edge 5, be corrugated in a waveform to the inner and outer peripheries of the end mill main body 1 in the direction of the axial line O. In this embodiment, a protrusion 9A having a convex curved line shape which is convex to outward of the end mill main body 1, and a recess 9B being in contact with the protrusion 9A and having a recessed curved line shape which is concave to inward of the end mill main body 1, are alternately formed so as to be continuous at a constant pitch P. And profiles of the roughing parts 9 of the peripheral cutting edges 5, each profiles of them includes the protrusions 9A and the recesses 9B, are match with each other.

Further, the convex curved line which the protrusion 9A of the roughing part 9 in this embodiment forms, is formed such that a portion which extends from a peak 9C most protruding in a radial direction with respect to the axial line O when viewed from the rotation direction T of the end mill, toward the distal end of the end mill main body 1, has a larger radius of curvature than a portion extending from the peak 9C toward the posterior end, and thus has an asymmetric shape with respect to the peak 9C. In the roughing end mill of this embodiment in which the four peripheral cutting edges 5 are formed, the phase of the roughing part 9 of each peripheral cutting edge 5 is set such that the peak 9C of the protrusion 9A is shifted to the posterior end in the direction of the axial line O of the end mill main body 1 by P/4 obtained by dividing the pitch P by the number of cutting edges, in the order shown in FIGS. 4A to 4D, from one peripheral cutting edge 5 toward another peripheral cutting edge 5 adjacent to the rotation direction T of the end mill.

Further, in this embodiment, the foremost protrusion 9A of the roughing part 9 of one peripheral cutting edge (the peripheral cutting edge shown in FIG. 4A) 5 is located closer to the distal end of the end mill main body 1 than those of the other peripheral cutting edges 5, the peak 9C in the radial direction of the foremost protrusion 9A of the one peripheral cutting edge 5 is connected to another peak 8A in the radial direction of the corner cutting edge 8 which is connected to the distal end of the one peripheral cutting edge 5, by a straight portion 10 extending in a linear manner when viewed from the rotation direction T of the end mill. Further, also the peak 9C in the radial direction of the foremost protrusion 9A of the roughing part 9 of each of the other peripheral cutting edges (the peripheral cutting edges shown in FIGS. 4B to 4D) 5 is connected to another peak 8A in the radial direction of the corner cutting edge 8 adjacent to the other peripheral cutting edge 5 by another straight portion 10 extending in a linear manner when viewed from the rotation direction T of the end mill.

Here, in this embodiment, the peak 9C of the foremost protrusion 9A of each peripheral cutting edge 5 and the peak 8A of the corner cutting edge 8 are made such that the radii from the axial line O are the same each other. And the straight portion 10 of each peripheral cutting edge 5 is formed so as to become a tangent line which is tangent to the convex curved lines which the protrusion 9A and the corner cutting edge 8 form, at the peaks 9C and 8A, and thus forms a single cylindrical surface centered on the axial line O in the rotation locus around the axial line O. Further, in this embodiment, a first radius of the end mill main body 1 which is a length between the axial line O and the peak 9C in the radial direction of the other protrusions 9A excluding the foremost protrusion 9A of the roughing part 9 of each of the peripheral cutting edges 5 is equal to a second radius of the end mill body 1 which is a length between the axial line O and the peak 9C of the foremost protrusion 9A of the roughing part 9, and is equal to a third radius of the end mill body 1 which is a length between the axial line O and the peak 8A of the corner cutting edge 8. That is, in this embodiment, the peaks 9C of the protrusions 9A in the roughing parts 9 of all the peripheral cutting edges 5 are located on the single cylindrical surface which is formed by the rotation locus around the axial line O of the straight portion 10.

Further, a length L in the axial direction of the straight portion 10 of each of the peripheral cutting edges 5 is less than or equal to twice a pitch P of the waveform pattern of the roughing part 9. In particular, in this embodiment, even in the straight portion 10 having the longest length L in the direction of the axial line O, of the peripheral cutting edge 5 shown in FIG. 4D, the length thereof is made so as to become equal to the pitch P of the roughing part 9. That is, the lengths L in the direction of the axial line O of the straight portions 10 of all the peripheral cutting edges 5 are made to be less than or equal to the pitch P of the waveform in the roughing part 9.

In the roughing end mill configured in this manner, among the peripheral cutting edges 5, in the peripheral cutting edge 5 in which the foremost protrusion 9A of the roughing part 9 is located closest to the distal end in the direction of the axial line O, the peak 9C in the radial direction of the foremost protrusion 9A is connected to the peak 8A in the radial direction of the corner cutting edge 8 by the straight portion 10. And also in other peripheral cutting edges 5, the peak 9C of the foremost protrusion 9A of each of the roughing parts 9 and the peak 8A of the corner cutting edge 8 are connected by the straight portion 10. For this reason, in all the peripheral cutting edges 5, formation of a corner portion due to intersection of the recess 9B of the roughing part 9 with the corner cutting edge 8 does not occur.

Therefore, as described above, in a case of forming a cup-shaped recess having an inclined inner wall face in a work material such as a metal die, when performing rough machining exclusively by the roughing part 9 by driving the end mill main body 1 up in a staircase pattern while revolving the end milt main body 1 along the inclined inner wall face from the bottom surface of the recess, it is possible to prevent fracturing or the like from occurring in such a corner portion. Further, after such stepwise rough machining is performed, even when finishing the inner wall face of the recess by exclusively using the convexly curved corner cutting edge while revolving the end mill main body as tracing a contour line of the recess, it is possible to continuously and efficiently perform the machining of such a recesses by a single roughing end mill without causing degradation of a finished surface accuracy due to the inner wall face which should be smoothly finished being damaged by a corner portion.

Further, in this embodiment, the length L in the direction of the axial line O of the straight portion 10 of each of the peripheral cutting edges 5 is less than or equal to twice the pitch P of the waveform in the roughing part 9, and the roughing part 9 with a waveform pattern of recesses and protrusions does not become shorter than necessary. Therefore, it is possible to sufficiently exhibit a vibration suppression effect associated with chip breaking generation by the roughing part 9 at the time of the rough machining described above, and it is possible to attain improvement in the machined surface accuracy of the rough machining and as a result, obtain a good finished surface accuracy. That is, if the straight portion 10 having the length L exceeding twice the pitch P of the roughing part 9 is formed, when the straight portion 10 has been bitten into the work material, a large impact acts, whereby vibration is generated in the end mill main body, and thus there is a concern that a rough-machined surface accuracy may be degraded.

Incidentally, in this manner, the length L of the longest straight portion 10 is made to be less than or equal to twice the pitch P. However, the length L of the shortest straight portion 110 may be 0. That is, the foremost protrusion 9A of the roughing part 9 of one peripheral cutting edge 5 is located closer to the distal end of the end mill main body 1 than those of the other peripheral cutting edges 5, the peak 9C in the radial direction of the foremost protrusion 9A of the one peripheral cutting edge 5 is aligned with another peak 8A in the radial direction of the corner cutting edge 8 which is connected to the distal end of the one peripheral cutting edge 5, and thus the convex curved lines which the protrusion 9A and the corner cutting edge 8 form may be made so as to come into contact with each other at the peaks 9C and 8A. Even in this case, a corner portion is not formed, and therefore, it is possible to exhibit the above-described effect.

Further, in this embodiment, the first radius of the end mill main body 1 which is the length between the axial line O and the peak 9C in the radial direction of the other protrusions 9A excluding the foremost protrusion 9A of the roughing part 9 of each of the peripheral cutting edges 5 is equal to the second radius of the end mill body 1 which is the length between the line O and the peak 9C of the foremost protrusion 9A of the roughing part 9. And in this way, it is possible to promote efficient finish machining by reducing uncut portions at the time of the rough machining, and on the other hand, even in the finish machining, the protrusions 9A other than the foremost protrusion 9A of the roughing part 9 are prevented from interfering with a machined surface, and thus it is possible to obtain a good finished surface accuracy.

That is, if the first radius is larger than the second radius, at the time of the finish machining, in particular, the peak 9C of the protrusion 9A which is located near the distal end next to the foremost protrusion 9A interferes with the finished surface, and thus there is a concern that a surface accuracy may be impaired. On the other hand, conversely, if the first radius is too small, it does not become possible to make the roughing part 9 deeply cut in the radial direction with respect to the axial line O when performing the rough machining in a staircase pattern, and thus uncut s become larger, and the is a concern that a reduction in machining efficiency may be caused due to an increase in a cutting margin at the time of the finish machining, or degradation of a finished surface accuracy may be caused due to trying to finish a large cutting margin at once.

Figure 5:
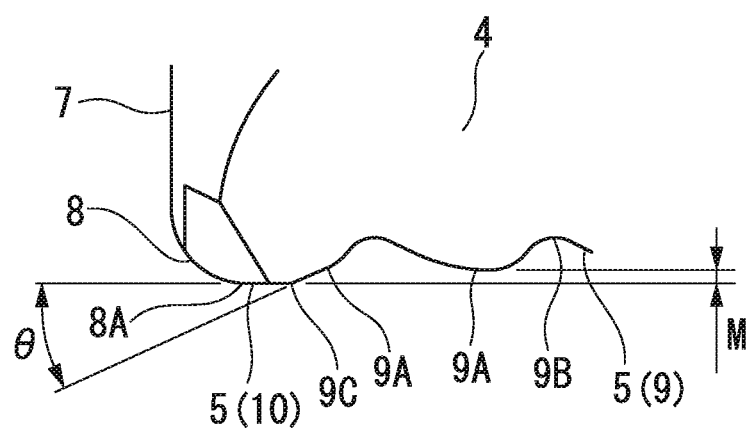
FIG. 5 is an enlarged view when a cutting edge portion of a modification example of the embodiment shown in FIG. 1 is viewed from the rotation direction of the end mill.

Further, in this embodiment, in this manner, the first radius of the peak 9C of the other protrusions 9A excluding the foremost protrusion 9A of the roughing part 9 of each of the peripheral cutting edges 5 is equal to the second radius of the peak 9C of the foremost protrusion 9A of the roughing part 9. That is, the peaks 9C of all the protrusions 9A are made so as to be located on a single cylindrical surface which the straight portion 10 forms in the rotation locus around the axial line O. However, for example, as in a modification example of the first embodiment shown in FIG. 5, the first radius of the peak 9C of the other protrusions 9A excluding the foremost protrusion 9A of the roughing part 9 of each of the peripheral cutting edges 5 may be made to be smaller than the second radius of the peak 9C of the foremost protrusion 9A of the roughing part 9 by in a range M up to 0.04 mm. If the first radius is made to be small beyond the range M, there is a concern that a reduction in machining efficiency due to an increase of a cutting margin at the time of the finish machining, or degradation of a finished surface accuracy may be caused, as described above. However, if it is a small range M to 0.04 mm, it is possible to suppress occurrence of uncut portions larger than necessary.

Further, it is desirable that a first clearance angle in the straight portion 10 of the peripheral cutting edge 5 is equal to a second clearance angle in the roughing part 9, or is smaller than the second clearance angle by in a range up to 2 degrees. In this embodiment, the first clearance angle is made to be equal to the second clearance angle. The straight portion 10 is connected to the corner cutting edge 8 and used in cutting at the time of the finish machining, and in particular, as in the modification example shown in FIG. 5, if the straight portion 10 protrudes further than the protrusions 9A other than the foremost protrusion 9A of the roughing part 9, a cutting margin at the time of the rough machining is increased. Therefore, if the first clearance angle of the straight portion 10 is larger than the second clearance angle of the roughing part 9, a wedge angle of the peripheral cutting edge 5 in the straight portion 10 becomes smaller, and thus cutting edge strength is reduced and damage easily occurs. Therefore, there is a concern that an end mill life may be shortened.

However, if the first clearance angle of the straight portion 10 is more than 2 degrees smaller than the second clearance angle of the roughing part 9, flank face wear is promoted, and thus, rather, there is a concern that the end mill life may be shortened. Further, the flank face of the straight portion 10 has a cylindrical surface shape having an outer diameter equal to the outer diameter of the peripheral cutting edge in the straight portion 10 and may be a so-called eccentric flank face (a second surface) to which the first clearance angle is given due to the center line of the cylindrical surface being eccentric from the axial line O parallel to the axial line O.

Further, in this embodiment, the foremost protrusion 9A in the roughing part 9 of each peripheral cutting edge 5 is formed in a convex curved line shape and is in contact with the straight portion 10 at the peak 9C in the radial direction, and an angle of inclination of the convex curved line which the foremost protrusion 9A forms at the peak 9C, with respect to the straight portion 10, is made to be 0 degree. However, if formation of a sharp corner portion due to intersection of a recess of a roughing part with a corner cutting edge, as in the roughing end mill described in PTL 1, does not occur, the foremost protrusion 9A may intersect with the straight portion 10 at an angle, as in the modification example shown FIG. 5. Or the foremost protrusion 9A of the roughing part 9 of the one peripheral cutting edge 5 is located closer to the distal end of the end mill main body 1 than those of the other peripheral cutting edges 5, the peak 9C in the radial direction of the foremost protrusion 9A of the one peripheral cutting edge 5 may be aligned with the peak 8A in the radial direction of the corner cutting edge 8, thereby intersecting a tangent line to the peak 8A in the radial direction of the corner cutting edge 8 when viewed from the rotation direction T of the end mill at an angle. However, in this way, even in a case where the foremost protrusion 9A intersects the straight portion 10 or the tangent line to the peak 8A in the radial direction of the corner cutting edge 8 at an angle, if an angle of inclination θ of the foremost protrusion 9A with respect to the straight portion 10 at the peak 9C in the radial direction, that is, an intersection point with the straight portion 10, or an angle of inclination θ of the foremost protrusion 9A with respect to the tangent line to the peak 8A in the radial direction of the corner cutting edge 8 is too large, in particular, t the time of the rough machining, fracturing or the like easily occurs, and therefore, it is desirable that the angle of inclination θ is less than or equal to 10 degrees.

Figure 6A:
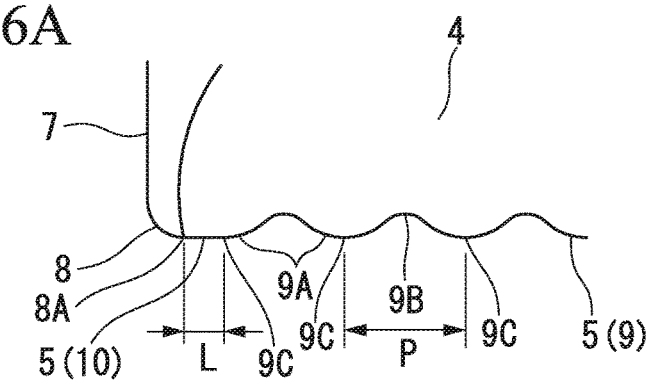
FIG. 6A is an enlarged view when a first cutting edge portion of a second embodiment of the present invention is viewed from the rotation direction of the end mill.
Figure 6B:
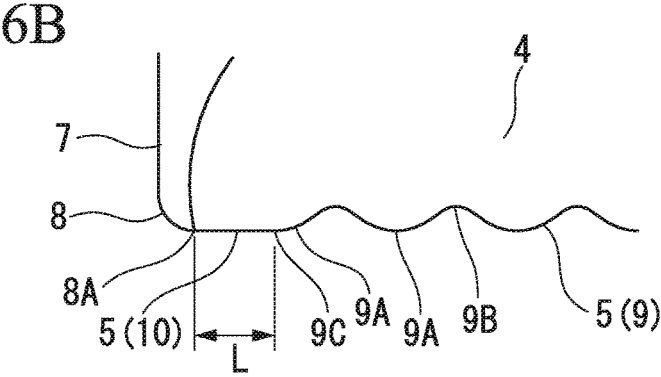
FIG. 6B is an enlarged view when a second cutting edge portion of the second embodiment of the present invention is viewed from the rotation direction of the end mill.
Figure 6C:
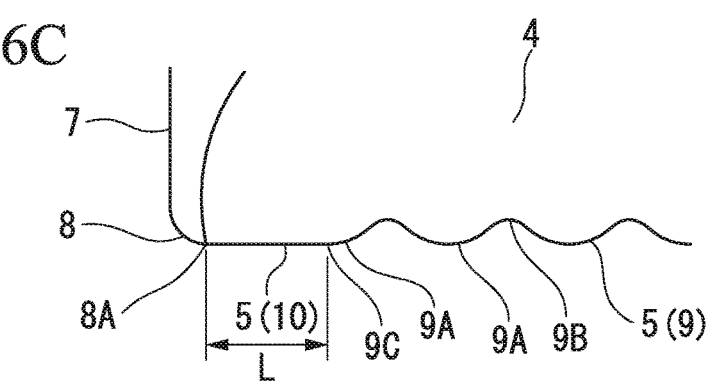
FIG. 6C is an enlarged view when a third cutting edge portion of the second embodiment of the present invention is viewed from the rotation direction of the end mill.

Next, FIGS. 6A to 6C show a second embodiment of the present invention, and portions shared by the first embodiment are denoted by the same reference numerals and the description thereof is omitted. In the first embodiment, the four peripheral cutting edges 5, the four end cutting edges 7, and the four corner cutting edges 8 are formed at the cutting edge portion 3 of the end mill main body 1, whereas in the second embodiment, the roughing end mill is a three-cutting edge roughing end mill in which each of the peripheral cutting edge 5, the end cutting edge 7, and the corner cutting edge 8 is formed by three. And in the protrusions 9A in the roughing parts 9 of the peripheral cutting edges 5, the phase is set such that the peak 9C thereof is shifted to the posterior end in the direction of the axial line O of the end mill main body 1 by P/3 obtained by dividing the pitch P by the number of cutting edges, in the order shown in FIGS. 6A to 6C, from one peripheral cutting edge 5 toward another peripheral cutting edge 5 adjacent to the rotation direction T of the end mill. Further, in the second embodiment, the shape of the protrusion 9A is formed in a convex curved line shape which is a symmetrical shape when viewed from the rotation direction T of the end mill, rather than being asymmetrical at the distal end side and the posterior end side with respect to the peak 9C, as in the first embodiment.

Also in the roughing end mill of the second embodiment, the foremost protrusion 9A of the roughing part 9 of one peripheral cutting edge (the peripheral cutting edge shown in FIG. 6A) 5 is located closer to the distal end of the end mill main body 1 than those of the other peripheral cutting edges 5, the peak 9C in the radial direction of the foremost protrusion 9A of the one peripheral cutting edge 5 is connected to another peak 8A in the radial direction of the corner cutting edge 8, by a straight portion 10 extending in a linear manner when viewed from the rotation direction T of the end mill. And also the peak 9C in the radial direction of the foremost protrusion 9A of the roughing part 9 of each of the other peripheral cutting edges (the peripheral cutting edges shown in FIGS. 6B and 6C) 5 is connected to another peak 8A in the radial direction of the corner cutting edge 8 by another straight portion 10. And thus formation of a corner portion due to intersection of the recess 9B of the roughing part 9 with the corner cutting edge 8 does not occur. Therefore, the same effect as in the first embodiment can be obtained. Of course, in the second embodiment, the foremost protrusion 9A of the roughing part 9 of one peripheral cutting edge 5 is located closer to the distal end of the end mill main body 1 than those of the other peripheral cutting edges 5, the peak 9C of the foremost protrusion 9A of the one peripheral cutting edge 5 may be aligned with the peak 8A of the corner cutting edge 8.

Further, in the roughing end mill as in the first and second embodiments, a twist angle of at least one of the plurality of peripheral cutting edges 5 spirally twisted is made to be an angle different from those of other peripheral cutting edges 5, whereby vibration can be cancelled out while cutting a work material by the peripheral cutting edges 5, and thus it is possible to prevent violent vibration from occurring due to resonance. In the first and second embodiments, all the twist angles of the plurality of peripheral cutting edges 5 may be different from each other. Also, in the first embodiment in which an even number of peripheral cutting edges 5 are formed, a configuration may be such that the twist angles of the peripheral cutting edges 5 adjacent to each other in the circumferential direction may be different from each other, while the twist angles of the peripheral cutting edges 5 being alternate in the circumferential direction are the same. Further, in the roughing part 9 of the peripheral cutting edge 5 with a waveform pattern of recesses and protrusions, an angle of a twist line connecting the peaks 9C of the protrusions 9A with respect to the axial line O may be set to be a twist angle.

Examples

Next, among those described in the above-described embodiments, with respect to the length L, in the direction of the axial line O of the straight portion 10 of the peripheral cutting edge 5, the effect thereof will be described using examples. In the examples, a cutting test forming a cup-shaped recess in the metal die as described above was performed by using roughing end mills of examples and comparative examples, which are based on the first embodiment of the present invention, but, in which the length L in the direction of the axial line O of the straight portion 10 of the peripheral cutting edge 5 is variously set, and the presence or absence of damage to the roughing end mill at that time and finished surface roughness were measured. In the roughing end mills used in the examples and the comparative examples, as the common specifications, the outer diameter of the peripheral cutting edge 5 was 10 mm, the number of cutting edges was four, the twist angles were the same twist angle which is 45 degrees, a cutting edge length was 22 mm, a clearance angle was 9 degrees, the pitch P of the waveform of the roughing part 9 was 1.2 mm, the radius of the corner cutting edge 8 was 0.5 mm, a material of the end mill main body 1 was cemented carbide, and the surface thereof was coated with a hard film made of (Al, Cr) N at an average film thickness of 3 μm.

Further, a material of the work material was a SUS420J2 material (hardness: 52 HRC), and a cup-shaped recess in which the inner diameter of a bottom surface is 50 mm, the inner diameter of an opening portion is 50.2 mm, and a depth is 18 mm was formed by a single roughing end mill by, in the rough machining, performing a cutting operation by driving the end mill main body 1 up in a staircase pattern, as described above, with the upper limit of a pitch in the direction of the axial line O (a Z-axis direction) being 10 mm and the upper limit of a pitch in a direction perpendicular to the axial line O (an XY direction) being 3 mm, at a rotational frequency of 3,200 min−1 and a feed rate of 640 mm/min, and, in the finish machining, performing a cutting operation along an inclined inner wall face while revolving the end mill main body 1 as tracing a contour line of the recess, with the pitch in the direction of the axial line O (the Z-axis direction) being 0.05 mm, at a rotational frequency of 6,400 min−1 and a feed rate of 2,400 mm/min.

As the roughing end mills of the examples of the present invention, a roughing end mill (Example 1) in which the peak 9C in the radial direction of the foremost protrusion 9A of the roughing part 9 in which the foremost protrusion 9A is located closest to the distal end, among the roughing parts 9 of four peripheral cutting edges 5, is aligned with the peak 8A in the radial direction of the corner cutting edge 8, the straight portion 10 is formed between the peak 9C of each of the foremost protrusions 9A of the roughing parts 9 of other peripheral cutting edges 5 and the peak 8A of the corner cutting edge 8, and the length L of the longest straight portion 10 of these is 0.9 mm, a roughing end mill (Example 2) in which the straight portion 10 is formed between the peak 9C of each of the foremost protrusions 9A in the roughing parts 9 of all the peripheral cutting edges 5 and the peak 8A of the corner cutting edge 8, and the length L of the longest straight portion 10 is 1.2 mm (equivalent to the pitch P), like the first embodiment, and a roughing end mill (Example 3) in which the straight portion 10 is likewise formed between the peak 9C of each of the foremost protrusions 9A in the roughing parts 9 of all the peripheral cutting edges 5 and the peak 8A of the corner cutting edge 8, and the length L of the longest straight portion 10 is 2.4 mm (twice the pitch P) were prepared.

Further, as the comparative examples, a roughing end mill (Comparative Example 1) in which although the peak 9C in the radial direction of the foremost protrusion 9A of the roughing part 9 in which the foremost protrusion 9A is located closest to the distal end, among the roughing parts 9 of one peripheral cutting edge 5, is aligned with the peak 8A in the radial direction of the corner cutting edge 8, like Example 1, the roughing parts 9 of other peripheral cutting edges 5 intersect the corner cutting edges 8 while having a waveform pattern of recesses and protrusions without having the straight portion 10, whereby a corner portion is formed at an intersection point with the recess 9B, a roughing end mill (Comparative Example 2) in which although the straight portion 10 is formed between the peak 9C of each of the foremost protrusions 9A in the roughing parts 9 of all the peripheral cutting edges 5 and the peak 8A of the corner cutting edge 8, like Examples 2 and 3, the length L of the longest straight portion 10 is 3.5 mm, and a roughing end mill (Comparative Example 3) in which the length L of the longest straight portion 10 is 5.0 mm were prepared.

When the cutting test was performed under the above-described conditions by using the roughing end mills of Examples 1 to 3 and Comparative Examples 1 to 3, in Comparative Example 1, in the rough machining, fracturing was generated in the corner portion in the intersection point of the corner cutting edge 8 with the recess 9B of the roughing part 9, and thus the test was terminated at that time. Further, in Comparative Examples 2 and 3, although fracturing did not occur, in the rough machining, vibration was generated in the end mill main body 1, and as a result, with respect to the finished surface roughness, the result that in Comparative Example 2, the maximum height Rz in JIS B 0601:2001 was 30.7 μm, and in Comparative Example 3, the maximum height Rz was 51.3 μm was obtained. In contrast with Comparative Examples 1 to 3, in Examples 1 to 3 relating to the present invention, damage such as fracturing or the like and vibration did not occur in the end mill main body 1, and with respect to the finished surface roughness, a good result that in Example 1, the maximum height Rz was 1.38 μm, in Example 2, the maximum height Rz was 1.71 μm, and in Example 3, the maximum height Rz was 2.20 μm could be obtained.

Subsequently, as before, among those described in the above-described embodiments, with respect to a relationship between the first radius of the end mill main body 1 which is the length between the axial line O and the peak 9C in the radial direction of the other protrusions 9A excluding the foremost protrusion 9A of the roughing part 9 of each of the peripheral cutting edges 5 and the second radius of the end mill body 1 which is the length between the axial line O and the peak 9C of the foremost protrusion 9A of the roughing part 9, the effect thereof will be likewise described using examples. In the examples, a cutting test was performed under the same conditions as the above by using roughing end mills of examples and comparative examples, which are based on the first embodiment of the present invention, as before, but, in which in the above-described common specifications, the first radius is variously set with respect to the second radius, and the finished surface roughness was measured. Further, the specifications other than the first radius and the second radius were the same as those in the first embodiment in all of the examples and the comparative examples.

Among these, in the examples of the present invention, a roughing end mill (Example 4) in which the first radius is equal to the second radius, like the first embodiment, a roughing end mill (Example 5) in which the first radius is small by 0.02 mm with respect to the second radius, and a roughing end mill (Example 6) in which the first radius is small by 0.04 mm with respect to the second radius were prepared. Further, as the comparative examples, a roughing end mill (Comparative Example 4) in which the first radius is large by 0.01 mm with respect to the second radius, a roughing end mill (Comparative Example 5) in which the first radius is small by 0.08 mm with respect to the second radius, and a roughing end mill (Comparative Example 6) in which the first radius is small by 0.15 mm with respect to the second radius were prepared.

As a result, in Comparative Example 4, the first radius is large with respect to the second radius, that is, the first radius is larger than the radius of the straight portion 10 or the third radius of the peak 8A of the corner cutting edge 8, and therefore, a finish machined surface was damaged by the protrusions 9A other than the foremost protrusion 9A of the roughing part 9, and the finished surface roughness was 5.79 μm at the maximum height Rz in JIS B 0601:2001. Further, in both of Comparative Examples 5 and 6 in which the first radius is too small with respect to the second radius, a cutting margin at the time of finish machining was increased, and since an attempt to cut this with single cut was made, vibration was generated, and in Comparative Example 5, the finished surface roughness become 3.71 μm at the maximum height Rz, and in Comparative Example 6, the finished surface roughness become 5.21 μm at the maximum height Rz.

In contrast with Comparative Examples 4 to 6, in Examples 4 to 6, neither damage to the finish machined surface nor vibration due to an increase in cutting ma occurred, and a good result that the finished surface roughness also was 1.71 μm at the maximum height Rz in Example 4, 1.80 μm at the maximum height Rz in Example 5, and 2.15 μm at the maximum height Rz in Example 6 could be obtained. Further, a cutting margin at the time of the finish machining was 0.1 mm in Example 1, 0.12 mm in Example 2, 0.14 mm in Example 3, 0.1 mm in Comparative Example 4, 0.18 mm in Comparative Example 5, and 0.25 mm in Comparative Example 6.

INDUSTRIAL APPLICABILITY

According to an aspect of the present invention, it becomes possible to efficiently perform machining which forms a cup-shaped recess having an inclined inner wall face in a metal die, by a single roughing end mill without causing fracturing of the end mill main body or degradation of the finished surface accuracy.

Therefore, the present invention has industrial applicability.

REFERENCE SIGNS LIST

1: end mill main body
2: shank portion
3: cutting edge portion
4: chip discharge flute
5: peripheral cutting edge
6: gash
7: end cutting edge
8: corner cutting edge
8A: peak in a radial direction of the corner cutting edge 8
9: roughing part
9A: protrusion of the roughing part 9
9B: recess of the roughing part 9
9C: peak in the radial direction of the protrusion 9A of the roughing part 9
10: straight portion
O: axial line of the end mill main body 1
T: rotation direction of the end mill
P: pitch of a waveform in the roughing part 9
L: length in a direction of the axial line O of the straight portion 10
M: range in which the first radius of the peak 9C of the other protrusions 9A excluding the foremost protrusion 9A of the roughing part 9 of each of the peripheral cutting edges 5 is smaller than the second radius of the peak 9C of the foremost protrusion 9A of the roughing part 9

θ: angle of inclination of the foremost protrusion 9A of the roughing part 9 with respect to the straight portion 10 when viewed from the rotation direction T of the end mill

The invention claimed is:

1. A roughing end mill comprising:
an end mill main body which is capable of being rotated around an axial line thereof; and
a plurality of chip discharge flutes formed on an outer periphery of a distal end portion of the end mill main body so as to extend in an axial direction of the end mill main body and which are arranged at intervals in a circumferential direction of the end mill main body, wherein
the end mill main body is provided with:
a peripheral cutting edge formed at an outer periphery section of a ridge portion of a wall surface of each of the chip discharge flutes, the wall surface facing a rotation direction of the end mill;
an end cutting edge formed at a distal end section of the ridge portion of the wall surface; and
a corner cutting edge formed at a corner portion between the peripheral cutting edge and the end cutting edge, and which has a convex curved line shape such that the corner cutting edge is raised outward the end mill main body, wherein
a roughing part having a waveform pattern of recesses and protrusions when viewed from the rotation direction of the end mill is formed in the peripheral cutting edge of each of the chip discharge flutes, wherein a phase of the recesses and protrusions of the roughing part of one chip discharge flute is shifted with respect to that of the other chip discharge flute adjacent to the one chip discharge flute in the circumferential direction,
a foremost protrusion of the roughing part of one peripheral cutting edge is located closer to a distal end of the end mill main body than those of the other peripheral cutting edges, a peak in a radial direction of the foremost protrusion of the one peripheral cutting edge is aligned with another peak in the radial direction of the corner cutting edge adjacent to the one peripheral cutting edge, or connected to the another peak in the radial direction of the corner cutting edge by a straight portion extending in a linear manner when viewed from the rotation direction of the end mill, and
a peak in the radial direction of a foremost protrusion of the roughing part of each of the other peripheral cutting edges is connected to another peak in the radial direction of the corner cutting edge adjacent to the other peripheral cutting edge by another straight portion extending in a linear manner when viewed from the rotation direction of the end mill.

2. The roughing end mill according to claim 1, wherein a length in the axial direction of the straight portion of each of the peripheral cutting edges is less than or equal to twice a pitch of the waveform pattern of the roughing part.

3. The roughing end mill according to claim 1, wherein a first radius of the end mill main body which is a length between the axial line and a peak in the radial direction of the other protrusions excluding the foremost protrusion of the roughing part of each of the peripheral cutting edges is equal to a second radius of the end mill body which is a length between the axial line and the peak of the foremost protrusion of the roughing part, or is smaller than the second radius by in a range up to 0.04 mm.

4. The roughing end mill according to claim 1, wherein a first clearance angle in the straight portion of the peripheral cutting edge is equal to a second clearance angle in the roughing part, or is smaller than the second clearance angle by in a range up to 2 degrees.

5. The roughing end mill according to claim 1, wherein the foremost protrusion of the roughing part of the one peripheral cutting edge is located closer to the distal end of the end mill main body than those of the other peripheral cutting edges, the peak in the radial direction of the foremost protrusion of the one peripheral cutting edge is aligned with the peak in the radial direction of the corner cutting edge, thereby intersecting a tangent line to the peak in the radial direction of the corner cutting edge when viewed from the rotation direction of the end mill at an angle of inclination less than or equal to 10 degrees.

6. The roughing end mill according to claim 1, wherein the foremost protrusion of the roughing part of the one peripheral cutting edge is located closer to the distal end of the end mill main body than those of the other peripheral cutting edges, the peak in the radial direction of the foremost protrusion of the one peripheral cutting edge is connected to the peak in the radial direction of the corner cutting edge by the straight portion extending in the linear manner when viewed from the rotation direction of the end mill, thereby intersecting the straight portion at an angle of inclination less than or equal to 10 degrees.

* * * * *